Reissued Dec. 3, 1935 Re. 19,773

UNITED STATES PATENT OFFICE 19,773

ELECTROCLEANING PROCESS

Thomas E. Dunn, Bridgeport, Conn., assignor to The Bullard Company, a corporation of Connecticut No Drawing. Original No. 1,898,765, dated February 21, 1933, Serial No. 618,403, June 20, 1932. Application for reissue February 1, 1935, Serial No. 4,560

12 Claims. (Cl. 204—7)

This invention relates to an electro-cleaning process for cleaning metal and has for its object to provide a process for removing the surface scale and other objectionable matter from forgings, castings, or the like.

It is among the prime objects of the invention to provide a cleaning process which, while being highly efficient and effective, will avoid the inherent disadvantages of present day mechanical, chemical or electro-chemical processes, such as their injury to the surface of the base metal of the object cleaned, and the expense and time consumed by such operations.

A further object is to provide a process which is particularly adapted for the descaling of objects having recessed or intricate surface designs and which in addition to removing scale or surface dirt from the work, will act to prevent hydrogen embrittlement and which will protect the work against deleterious chemical action, such as pitting or etching, and which will also protect the articles against subsequent rapid surface deterioration.

One highly important object and one which has not been heretofore achieved is to provide a process which in addition to descaling of the work will provide a highly tenacious and closely adherent metallic protective film thereover which is joined to the work surface by an alloy-like bond. Among the many advantages of this type of film bond in addition to the natural lasting virtue of such adherence is the translucent characteristic of the film in that defects of the work surface can be observed therethrough. Another advantage of this type of bonded film is the provision of a surface suitable for the reception of permanently adherent subsequent coatings or deposits.

Another highly important object of the present invention is to provide an electrolytic descaling process of the character disclosed, the electrolyte of which will remain efficient and effective over a long period of usefulness whereby the process is less vulnerable to interference by ions foreign to those useful to the process. Since with similar processes the electrolyte becomes contaminated by a growing concentration in the electrolyte of ferric ions so that the efficiency of the process is materially reduced, it is among the objects of the present invention to provide a process in which the oxidation of ferrous ions to ferric ions is partially or wholly inhibited.

Attention is directed to applicant's Patent No. 1,775,671, granted September 16, 1930, which discloses a process for acid cathodic descaling and simultaneous protection of forgings, castings, or similar scaled metallic articles. This application is a joint continuation of applicant's pending application No. 451,517, filed May 10, 1930 and applicant's joint application No. 482,151, filed September 15, 1930 and is, therefore, therewith a continuation in part of the application which resulted in applicant's prior patent above enumerated, the claims of which broadly cover a process which involves the generation of excessive hydrogen at the work which acts to mechanically detach the scale from the work surface, and in which the descaling of any portion of the work surface is followed instantaneously by the protection of the cleaned surface by the deposit of a metal film.

The present process has among its objects to partake of the desiderata of the process of the above patent, outstanding among which are that the finished work is (1) free from pits or etches, (2) free from voltaic couples and (3) free from hydrogen embrittlement. In addition to these virtues, the present process combines with them the advantage of producing a less soluble and more durable protecting film having a lighter and brighter appearance and which is thus more pleasing than the opaque lead film referred to in my patent. The film produced by the present process is not only harder and free from smut, but is bonded more adherently to the surface, its color and adherence being a valuable aid to inspection of the underlying body as well as providing a more presentable and thus more salable article and one readily adapted to receive subsequent permanently adhering coatings produced by hot tinning or galvanizing. Another novel feature of this process is that the film produced is susceptible of alloy union with the base metal as distinguishing from lead which will not alloy with iron. Thus the film, if not alloyed at the time of deposit, will so unite with the work as a result of subsequent heat application. The present process also has the advantage of retarding the increase of ferric ion concentration of the electrolyte, thus insuring a longer and/or more highly efficient life for the bath.

In carrying out the present process I make the work, which is preferably iron or steel, cathode in an acid bath which contains ions of a metal having an affinity for iron and which will upon deposit wet the iron surface, and thus closely adhere thereto. Tin is utilized as a preferable illustration of the metal to be selected, although such metals as zinc and its sister metal, cadmium, may be used since they display a similar affinity, and thus will wet and alloy with the work surface. The acid solution may be composed of sulfuric acid, hydrochloric acid, and common salt. However, I prefer an electrolyte having little or no chlorides therein. Since the virtue of the chloride ions resides chiefly in their effectiveness to cause accelerated anode corrosion and since with the use of tin, anode corrosion takes place without the presence of chlorides, and further, since chlorides attack heating coils used to warm the electrolyte and other accessories, they are preferably avoided. Such chloride free electrolytes are also cheaper and are simpler to compound. Therefore, I prefer to use the following electrolyte: 10% $H_2SO_4$ by volume, 66° Bé., 90% $H_2O$, and 3 oz. per gal. of sodium sulphate ($Na_2SO_4$—$10H_2O$).

While this composition illustrates one possible electrolyte, it will, of course, be understood that different components may be used and widely varying proportions substituted. Thus, when using zinc I prefer to substitute sodium or mercuric chloride for the sodium sulphate. The wide departure from the specified formula to which the process is susceptible has a distinct advantage in that it does not require the close chemical control, which is advisable in other processes.

While the process will function properly by the introduction of the ions of the metal to be deposited through the inclusion in the electrolyte of salts thereof, I prefer for the sake of automatic control, as well as for the sake of simplicity and economy, to introduce the ions of the metal by the use of anodes formed thereof. The process, therefore, departs from the teaching of my original patent in that I use in conjunction with anodes of the metal to be plated, insoluble anodes which will not give to the solution ions capable of electrolytic deposition on the cathode. Thus, with the metals mentioned, I prefer to have approximately only two percent of the total anode area formed of the metal which is to form the film. The remaining anode area required for the sufficient excitation of the bath is preferably formed of insoluble anodes. A further virtue of the use of a large area of insoluble anodes is that since no energy is required to disintegrate and ionize metal at the surface of such insoluble anodes, it follows that for a given energy input, the volume of hydrogen liberated at the cathode is increased and consequently the efficiency of the process is greater than when all the anode area is formed of the metal used for the protecting film. In carrying out the process, I prefer to use cathode current densities approximately 50–100 amps. per square foot of work surface under treatment.

It has been found that the efficiency of the process decreases at a substantially inverse ratio to the increase of ferric ion concentration. Therefore, the present invention embraces the use of anodes at which reactions tend to inhibit the oxidation of the ferrous ions to ferric ions. The electrolyte of the present process has thus been found to have materially longer and/or more highly efficient life than the electrolyte of a process using lead. This advantage in the present process is deemed to be the result not of differences in electrolytes but as a result of marked differences in the anode reactions of this process. Theoretically, among these differences is that in the use of this process, a colloidal shielding film of metastannic acid is formed on the insoluble anode surface. This film prevents the electrolyte bearing ferrous ions from coming into direct contact with the surface of the anode where the ferrous ion content would be actively oxidized to the ferric state. However, when lead is used as the protective metal film and the anode surface is composed of lead or a lead alloy, no such shielding diaphragm-like film is formed and consequently the electrolyte bearing ferrous ions readily come into direct contact with the surface of the lead anode. Consequently, the ferrous ions are rapidly oxidized to the ferric state. Furthermore, the surfaces of lead anodes become coated with lead peroxide ($PbO_2$) which, as is well known, exerts a strong catalytic action favoring oxidization and therefore, with lead anodes, two distinct anode conditions are obtained both strongly favoring the rapid increase of the ferric ion concentration of the electrolyte. This is in sharp distinction to the highly favorable anode reaction of this present process, which leads to the formation of an enshrouding metastannic colloidal diaphragm-like film which tends to inhibit the oxidation of the ferrous ions.

When a scaled article is introduced in the electrolyte as cathode and is subjected to high current densities, excessive quantities of hydrogen are vigorously liberated at the surface of the work. The action of the hydrogen, either along, or in conjunction with, chemical attack, acts mechanically to wedge or crowd off the scale, leaving a denuded clean surface area. Since the clean surface provides a direct relatively less-resistant electrical path through the base metal, the deposit of a metal film such as tin, will take place immediately thereon, and since such deposit acts to increase the polarization at that portion of the surface, the concentration of electrolytic action will shift or be thrown to other less polarized portions of the surface. This so-called "throwing" characteristic of the process has, in connection with the use of metals, such as tin, having lower over-voltage than lead and having an affinity for iron, a distinct difference from the reaction of lead ions at the cathode. Thus, while it would appear from a consideration of throwing power alone that such metals would be less efficient than lead, it will be apparent that less energy is required at the cathodes for their deposition, because their hydrogen over-voltage is less, and the natural affinity of tin or like metals for iron will also aid in the reaction and in practice tends to offset the lower throwing power.

In the operation of the process, it is found that the initial strata of the film deposit actually tend to wet or alloy with the iron surface, the result being that in place of the deposit of a mechanically bonded and thus less adherent lead film, there is a positive tendency of the tin molecules to wet and spread over the surface of the base metal and to join therewith by metallurgical union. Another feature of the process is that the film is of a metal which will readily form a true alloy with the base by subsequent heating.

The process, therefore, produces a bimetallic article, the outer surface of which is an integral portion of the whole and yet formed of a different metal. It will, of course, be understood that with the use of the high current densities specified, there may be deposited on top of the alloy-like film, loose, spongy deposits of the pure metal such as tin or zinc. This may be washed or brushed off, leaving a very thin film which has the characteristics of translucency in that flaws of the base metal such as hair line cracks may be observed therethrough. Furthermore, the finished article presents a pleasing bright surface which is highly advantageous in certain fields. This surface has a high scratch hardness and is free from the graphite-like soiling characteristic of lead surfaces. The integral bonding of the film is also of major importance in connection with subsequent treatments, such, for instance, hot tinning or galvanizing.

From a consideration of this specification, it will be understood that this process is not restricted to the use of the specific metallic ions referred to, but is understood to be generic in its teaching of the use of ions having an affinity for or being capable of alloy bonding with the base metal of the work and to metals which tend to inhibit the oxidation of ferrous to ferric ions in the electrolyte. As indicated, the characteristics of the bath, not only as to the proportions of the ingredients, but as to the ingredients themselves, can be widely varied without departure from the spirit or scope of the invention.

Having thus set forth the nature of my invention, what I claim is:

1. A method of cleaning surfaces which includes the step of removing surface foreign matter by the cathodic production of hydrogen at the work and simultaneously protecting the cleaned surface by the deposit thereon of tin in an acid electrolyte in which there are soluble and insoluble anodes.

2. A method of cleaning surfaces which includes the step of removing surface foreign matter by the cathodic production of hydrogen at the work and simultaneously protecting the cleaned surface by the deposit thereon of tin in an acid electrolyte in which there are soluble and insoluble anodes, the former giving to the electrolyte ions capable of depositing on the cleaned work simultaneously with the cleaning.

3. A method of cleaning surfaces which includes the step of removing surface scale by subjecting the work to cathodic action in an acid electrolyte in which there are soluble and insoluble anodes the former including tin and providing the requisite surface area for continuously maintaining a desired tin ion concentration for simultaneously depositing during the cleaning, a metallic protective film on the work.

4. A metal cleaning process which includes the step of removing surface foreign matter by the cathodic production of hydrogen at the work and simultaneously protecting the cleaned surface by the deposit of tin thereon in an acid electrolyte containing salts of tin which by the action of the process automatically forms a shielding diaphragm of metastannic acid about an insoluble anode to inhibit the oxidation of low valence ions which may be formed from dislodged foreign matter.

5. A process as set forth in claim 4 characterized by the use of a soluble anode including tin to continuously supplying tin ions to the solution.

6. A process as set forth in claim 4 characterized by the use of both soluble and insoluble anodes the former providing tin for the deposit on the work and for the formation of the metastannic acid film.

7. The process of electrolytically removing scale from ferrous metal surfaces and simultaneously electro-depositing tin thereon comprising subjecting said surface to the action of a bath containing a scale-removing concentration of a pickling acid while passing current through the bath to the surface as cathode, to thereby evolve hydrogen at said surface, the bath also containing such concentration of tin salt that the current employed will deposit a continuous adherent coating of tin on said surface in substantially the time required for the removal of scale therefrom.

8. The process of treating articles of ferrous metal to remove scale comprising placing the article in a bath containing a sufficient concentration of pickling acid to effect scale removal, passing through the bath to the article as cathode an electric current of such strength as to cause copious evolution of hydrogen at the cathode to assist in removal of scale, maintaining in the bath a concentration of tin salts of such character that tin can be deposited therefrom by the said current, and so adjusting the concentration of tin salts, the acidity, current density and temperature that a thin deposit of tin forms upon the scale-free surfaces of the article in substantially the time required to remove the scale and of substantially only the thickness required to protect the cleaned surface from attack by the acid.

9. The process of cleaning and coating an article having ferrous metal surfaces comprising immersing the article in a bath containing a pickling acid in such concentration as to remove scale and also a tin salt from which tin may be electrolytically deposited, supplying electric current to the article as cathode in the bath in quantities between 50 and 100 amperes per square foot of cathode surface, the acid concentration being maintained such as to effect electrolytic pickling with the current employed and the concentration of tin being maintained such as to effect deposits of tin upon the cleaned surfaces sufficient to protect the cleaned surface from further attack by the acid.

10. The process as set forth in claim 7, the bath containing sulphuric acid to the amount of approximately 10% by volume.

11. The process of electrolytically removing scale from ferrous metal surfaces and simultaneously electro-depositing tin thereon comprising subjecting said surface as cathode in an acid electrolyte, maintaining for the electrolyte a continuous supply of tin, passing current through the bath to thereby evolve hydrogen at said surface for removing scale and depositing a continuous adherent coating of tin on said surface in conjunction with the scale removal therefrom.

12. The process of electrolytically removing scale from ferrous metal surfaces and simultaneously electro-depositing tin thereon comprising subjecting said surface as cathode in an acid electrolyte containing tin to the action of current passing through the bath whereby the current employed will evolve hydrogen at said surface for removing scale, will deposit a continuous adherent coating of tin on the surface in conjunction with the scale removal and will automatically provide a continuous supply of tin for the electrolyte.

THOMAS E. DUNN.